US009561592B1

(12) United States Patent
da Silva et al.

(10) Patent No.: US 9,561,592 B1
(45) Date of Patent: Feb. 7, 2017

(54) GROUND PLANE COMPENSATION FOR LEGGED ROBOTS

(71) Applicant: Google Inc., Mountain View, CA (US)

(72) Inventors: Marco da Silva, Arlington, MA (US); Kevin Blankespoor, Arlington, MA (US); Gabriel Nelson, Wilmington, MA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 14/713,569

(22) Filed: May 15, 2015

(51) Int. Cl.
G05B 19/00 (2006.01)
B25J 9/16 (2006.01)
G01C 9/00 (2006.01)
B25J 5/00 (2006.01)

(52) U.S. Cl.
CPC ............... B25J 9/1694 (2013.01); B25J 5/00 (2013.01); B25J 9/1664 (2013.01); G01C 9/00 (2013.01); Y10S 901/01 (2013.01)

(58) Field of Classification Search
CPC combination set(s) only.
See application file for complete search history.

(56) References Cited

U.S. PATENT DOCUMENTS

| 4,834,200 | A * | 5/1989 | Kajita | B62D 57/02 180/8.1 |
| 5,432,417 | A * | 7/1995 | Takenaka | B62D 57/032 180/8.6 |
| 6,697,709 | B2 * | 2/2004 | Kuroki | B62D 57/032 318/565 |
| 7,603,234 | B2 * | 10/2009 | Takenaka | B62D 57/032 318/568.1 |
| 7,606,634 | B2 * | 10/2009 | Takenaka | B62D 57/032 180/65.1 |
| 8,630,763 | B2 * | 1/2014 | Goulding | B62D 57/024 318/568.11 |
| 8,781,628 | B2 * | 7/2014 | Kwak | B62D 57/032 318/568.12 |
| 9,259,838 | B1 * | 2/2016 | Blankespoor | B25J 9/0006 |
| 9,308,648 | B2 * | 4/2016 | Perkins | B25J 5/00 |
| 9,446,518 | B1 * | 9/2016 | Blankespoor | B25J 9/1676 |
| 2003/0144763 | A1 * | 7/2003 | Mori | B62D 57/032 700/245 |
| 2004/0133308 | A1 * | 7/2004 | Kato | G06N 3/008 700/245 |
| 2005/0066397 | A1 * | 3/2005 | Hidai | B62D 57/032 700/245 |

(Continued)

*Primary Examiner* — Jonathan L Sample
(74) *Attorney, Agent, or Firm* — McDermott Boehnen Hulbert & Berghoff LLP

(57) ABSTRACT

An example implementation includes (i) receiving sensor data that indicates topographical features of an environment in which a robotic device is operating, (ii) determining, for a particular topographical feature of the environment in a direction of travel of the robotic device, a height of the particular topographical feature and a distance between the robotic device and the particular topographical feature, (iii) estimating a ground plane extending from the robotic device in the direction of travel toward the particular topographical feature, the ground plane fitting to the determined distance and height, (iv) determining a grade of the estimated ground plane, and (v) directing the robotic device to adjust pitch in proportion to the determined grade.

20 Claims, 12 Drawing Sheets

(56) References Cited

U.S. PATENT DOCUMENTS

| | | | | |
|---|---|---|---|---|
| 2005/0067993 A1* | 3/2005 | Kato | | B25J 19/0091 318/568.12 |
| 2006/0076167 A1* | 4/2006 | Setrakian | | B62D 57/00 180/8.1 |
| 2006/0197485 A1* | 9/2006 | Kawai | | B62D 57/032 318/568.12 |
| 2007/0013506 A1* | 1/2007 | Takenaka | | B62D 57/032 340/500 |
| 2007/0227786 A1* | 10/2007 | Hillis | | B62D 57/022 180/8.1 |
| 2008/0265821 A1* | 10/2008 | Theobald | | B25J 5/005 318/568.12 |
| 2009/0299523 A1* | 12/2009 | Kim | | B62D 57/032 700/245 |
| 2009/0306821 A1* | 12/2009 | Park | | B62D 57/032 700/245 |
| 2009/0308668 A1* | 12/2009 | Roh | | B62D 57/032 180/8.6 |
| 2009/0321150 A1* | 12/2009 | Kwon | | B25J 5/00 180/8.6 |
| 2010/0113980 A1* | 5/2010 | Herr | | A61F 2/60 600/587 |
| 2010/0114329 A1* | 5/2010 | Casler | | B25J 19/0008 623/24 |
| 2010/0324699 A1* | 12/2010 | Herr | | A61F 2/66 623/27 |
| 2011/0082566 A1* | 4/2011 | Herr | | A61F 2/60 623/24 |
| 2011/0098857 A1* | 4/2011 | Yoshiike | | B62D 57/032 700/246 |
| 2011/0172823 A1* | 7/2011 | Kim | | B62D 57/032 700/260 |
| 2011/0231050 A1* | 9/2011 | Goulding | | B62D 57/024 701/26 |
| 2011/0313568 A1* | 12/2011 | Blackwell | | B25J 5/007 700/245 |
| 2012/0143376 A1* | 6/2012 | Seo | | B62D 57/032 700/261 |
| 2012/0158183 A1* | 6/2012 | Lim | | B25J 9/162 700/261 |
| 2013/0079929 A1* | 3/2013 | Lim | | B62D 57/032 700/250 |
| 2015/0019013 A1 | 1/2015 | Rose et al. | | |

* cited by examiner

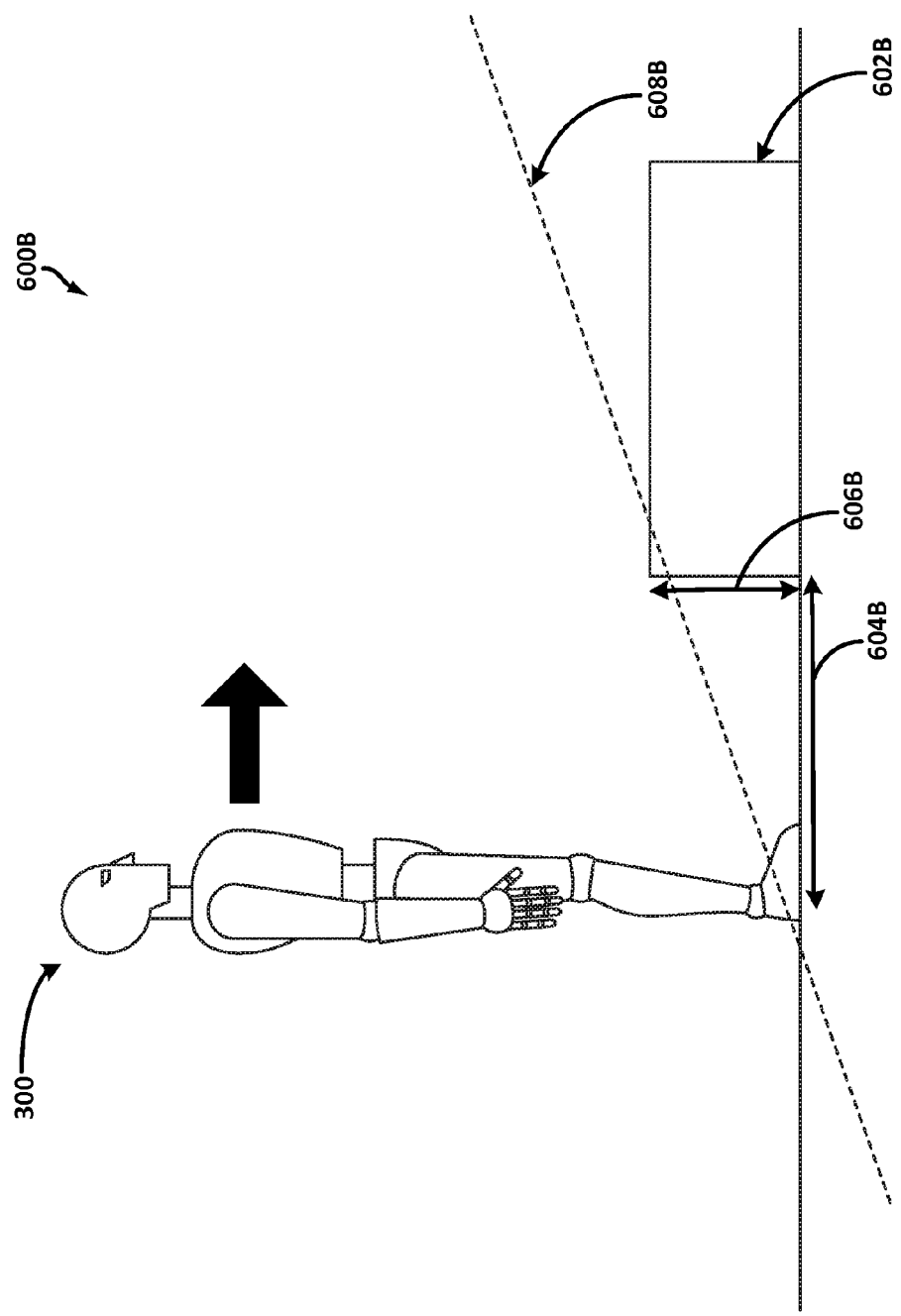

GROUND PLANE COMPENSATION FOR LEGGED ROBOTS

GOVERNMENT LICENSE RIGHTS

This invention was made with U.S. Government support under Contract No. HR00011-10-C-0025 awarded by DARPA. The Government may have certain rights with regard to the invention.

BACKGROUND

Some types of robots can be classified as legged robotic devices in that they are equipped with one or more legs by which they are able to move about an environment. Some examples of legged robotic devices include biped, or two-legged robots, and quadruped, or four-legged robots. During locomotion, legged robots may move according to a gait, or pattern of leg movements. Each cycle of this pattern may be referred to as a step. A robotic device may alter certain steps based on features of the environment.

SUMMARY

The present disclosure generally relates to controlling a legged robotic device. More specifically, implementations described herein may involve adapting a robot's gait parameters based on the environment in which the robot is operating. Since the environment in which the robotic device is may change as the robotic device traverses the environment, the legged robotic device may change gait parameters such as pitch or roll to facilitate traversing various topographical features of the environment.

A first example implementation includes (i) receiving sensor data that indicates topographical features of an environment in which a robotic device is operating, (ii) determining, for a particular topographical feature of the environment in a direction of travel of the robotic device, a height of the particular topographical feature and a distance between the robotic device and the particular topographical feature, (iii) estimating a ground plane extending from the robotic device in the direction of travel toward the particular topographical feature, the ground plane fitting to the determined distance and height, (iv) determining a grade of the estimated ground plane, and (v) directing the robotic device to adjust its pitch in proportion to the determined grade.

In a second example implementation, a control system is configured to (i) receive sensor data that indicates topographical features of an environment in which a robotic device is operating, (ii) determine, for a particular topographical feature of the environment in a direction of travel of the robotic device, a height of the particular topographical feature and a distance between the robotic device and the particular topographical feature, (iii) estimate a ground plane extending from the robotic device in the direction of travel toward the particular topographical feature, the ground plane fitting to the determined distance and height, (iv) determine a grade of the estimated ground plane, and (v) direct the robotic device to adjust its pitch in proportion to the determined grade.

A third example implementation includes a robotic system having at least one perception sensor, and a control system configured to perform operations. The operations include (i) receiving sensor data that indicates topographical features of an environment in which a robotic device is operating, (ii) determining, for a particular topographical feature of the environment in a direction of travel of the robotic device, a height of the particular topographical feature and a distance between the robotic device and the particular topographical feature, (iii) estimating a ground plane extending from the robotic device in the direction of travel toward the particular topographical feature, the ground plane fitting to the determined distance and height, (iv) determining a grade of the estimated ground plane, and (v) directing the robotic device to adjust its pitch in proportion to the determined grade.

A fourth example implementation includes a system. The system includes (i) a means for receiving sensor data that indicates topographical features of an environment in which a robotic device is operating, (ii) a means for determining, for a particular topographical feature of the environment in a direction of travel of the robotic device, a height of the particular topographical feature and a distance between the robotic device and the particular topographical feature, (iii) a means for estimating a ground plane extending from the robotic device in the direction of travel toward the particular topographical feature, the ground plane fitting to the determined distance and height, (iv) a means for determining a grade of the estimated ground plane, and (v) a means for directing the robotic device to adjust its pitch in proportion to the determined grade.

These as well as other aspects, advantages, and alternatives will become apparent to those of ordinary skill in the art by reading the following detailed description, with reference where appropriate to the accompanying drawings. This summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

BRIEF DESCRIPTION OF THE DRAWINGS

FIG. 6B illustrates an example environment in which a biped robot is operating, according to an example implementation.

DETAILED DESCRIPTION

Figure 1:
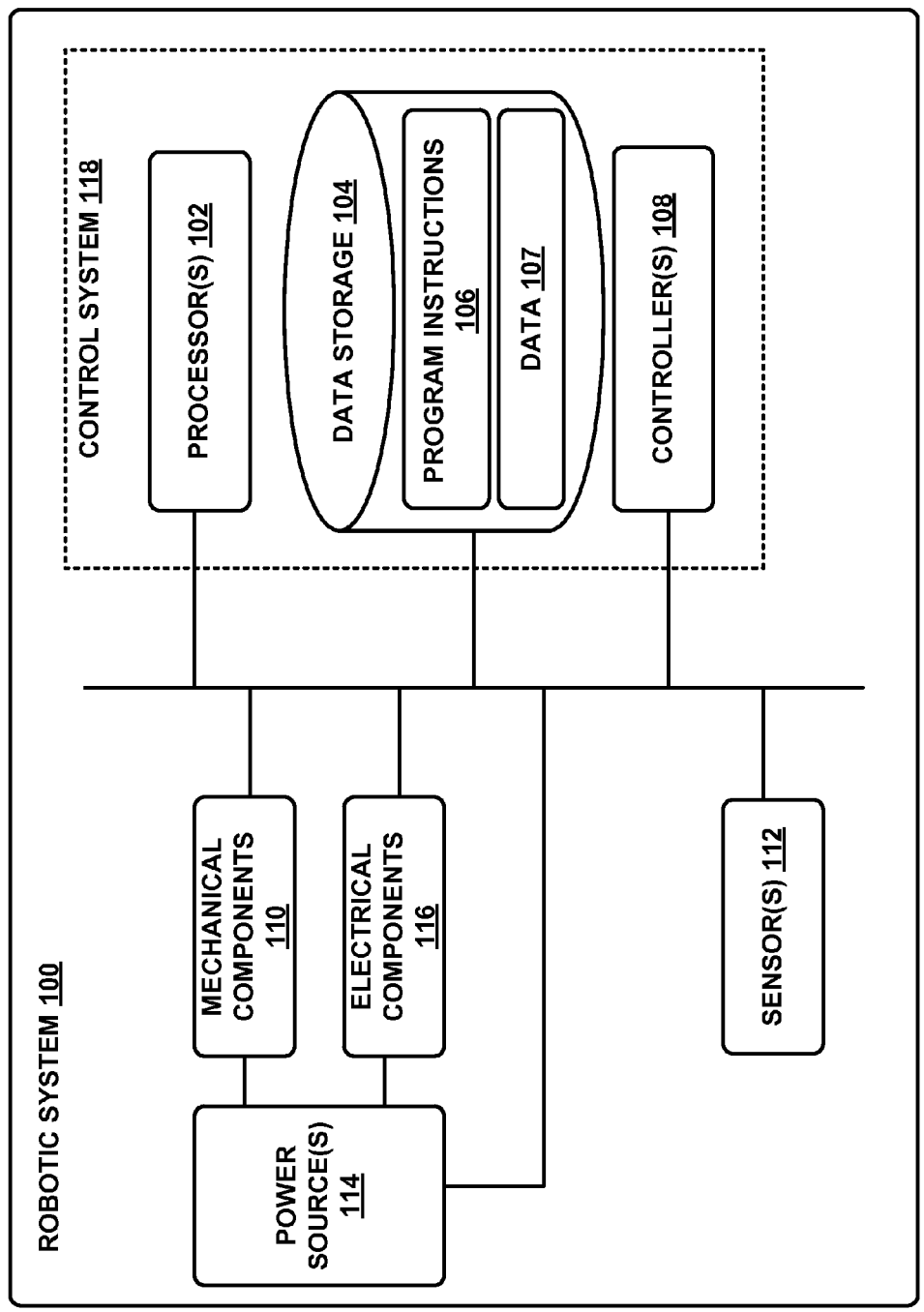
FIG. 1 illustrates a configuration of a robotic system, according to an example implementation.

Example apparatuses, systems and methods are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

A legged robot may include a control system that adjusts the robot's posture based on the upcoming terrain. Example legged robots include biped robots having two legs or quadruped robots having four legs, among other possible configurations (e.g., a triped, or three-legged robot). Such legged robots may move about an environment using their legs, perhaps by moving their legs according to a gait. "Gait" refers to the pattern of movement of the limbs of the robot during locomotion (e.g., walking or running). In operation, a robot may use a variety of gaits and select a particular gait based on considerations such as speed, terrain, maneuverability, and energy efficiency.

When traversing an environment, a robot may encounter uneven terrain. Terrain that is uneven in the direction of travel may affect the robot's gait, as the robot's feet may contact the ground sooner or later than anticipated. In some cases, the unevenness of the terrain may be significant enough to cause issues with kinematic reachability. For instance, during a step, one or more of the robot's leg joints might reach full extension before contacting the ground, which may cause undesirable effects, such as joint damage or loss of control (i.e., once a joint reaches full extension, no additional movement or force can be applied in the direction of extension).

A robot may attempt to avoid such undesirable effects by adjusting its posture in advance of traversing the uneven terrain. In particular, the robot may estimate the ground plane of upcoming terrain, and then adjust its pitch to offset the estimated ground plane of the terrain. Bipeds and quadrupeds may offset the estimated ground plane of the terrain using different techniques. Quadrupeds (and perhaps other robots with forward and rear legs) might adjust their pitch to match the estimated ground plane of the terrain. Such an adjustment may improve the kinematic reachability of the terrain relative to the robot, as the robot's front and rear legs may become relatively equidistant to the ground after such an adjustment. Bipeds might pitch forward when ascending and pitch backward when descending. Because biped robots stand upright, such robots might not match their pitch with the estimated ground plane of the terrain as with quadruped robots because such an adjustment may cause instability. Instead, bipeds might adjust their pitch by a fraction of the estimated ground plane (e.g., 10-40%).

Because adjusting pitch to offset upcoming ground plane may affect kinematic reachability on the terrain that the robot is currently traversing, a robot may time the adjustment of its pitch such that the robot changes its pitch before an upcoming change in ground plane, but not unnecessarily early. For instance, a biped might time the adjustment of its pitch to be approximately one stride in advance of an upcoming change in ground plane. In this manner, the biped will have adjusted its pitch by the time it reaches the change in ground plane, but will not have jeopardized kinematic reachability on the terrain it was previously traversing. In contrast, a quadruped might time the adjustment of its pitch to be approximately one and a half strides in advance of the upcoming change in ground plane, as it has multiple contact points with the ground.

In some cases, a robotic device may reduce its speed based on an upcoming change in ground plane. In the case of an upcoming downhill plane, speed reduction may avoid the feet of a robotic device leaving the ground (e.g., running off a cliff), which may cause stability issues. For an uphill plane, speed reduction may avoid the robotic device stumbling on the uphill plane, among other possible benefits.

Uneven terrain that is perpendicular to the direction of travel may be referred to as roll. Like pitch, roll may affect the robot's gait, as the roll may cause a left foot to contact the ground at a different interval than a right foot. Some robots may be able to adjust for some degree of roll by extending the legs on the downhill side of the roll by a greater degree than the uphill side of the roll. However, significant roll may cause one or more of the robot's leg joints to reach full extension before contacting the ground, which may cause the undesirable effects noted above. Extreme roll may also cause a robot to become unstable, as the roll may cause the robot to list to one side or the other. To offset roll, a robot may adjust its gait by bending its leg joints, thereby causing the robot to squat through its gait. Such an adjustment increases the degree to which the joint may extend to adjust for roll, which may improve kinematic reachability, perhaps at the cost of a less efficient gait.

To estimate the pitch and roll of upcoming terrain, a robot may be equipped with various sensors, such as a stereo vision system, that produce sensor data that indicates topographical features of the environment in which the robot is operating. Within such data, a control system of the robot may identify respective heights of one or more features that are located at respective distances ahead of the robot. The robot may then estimate the terrain's ground plane by averaging the respective changes in heights over the distances. As the robot moves through the environment, additional sensor data may be produced and analyzed to maintain an estimate of the upcoming ground plane, which may assist the robot in determining its target pitch.

In some cases, a robot might not be able to obtain sensor data indicative of topographical features in advance of the robot (e.g., if a vision system fails). In such cases, the robot may fall back to a proprioceptive estimate of ground plane. Such an estimate may be based on sensor data indicating the robot's position and orientation within the environment. Such measurements may indicate certain features of the terrain. For instance, sensor data indicating that a robot's body is pitched relative to gravity may be used to determine an estimated pitch of the terrain. The robot may then adjust its pitch and/or height to offset this estimated ground plane.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
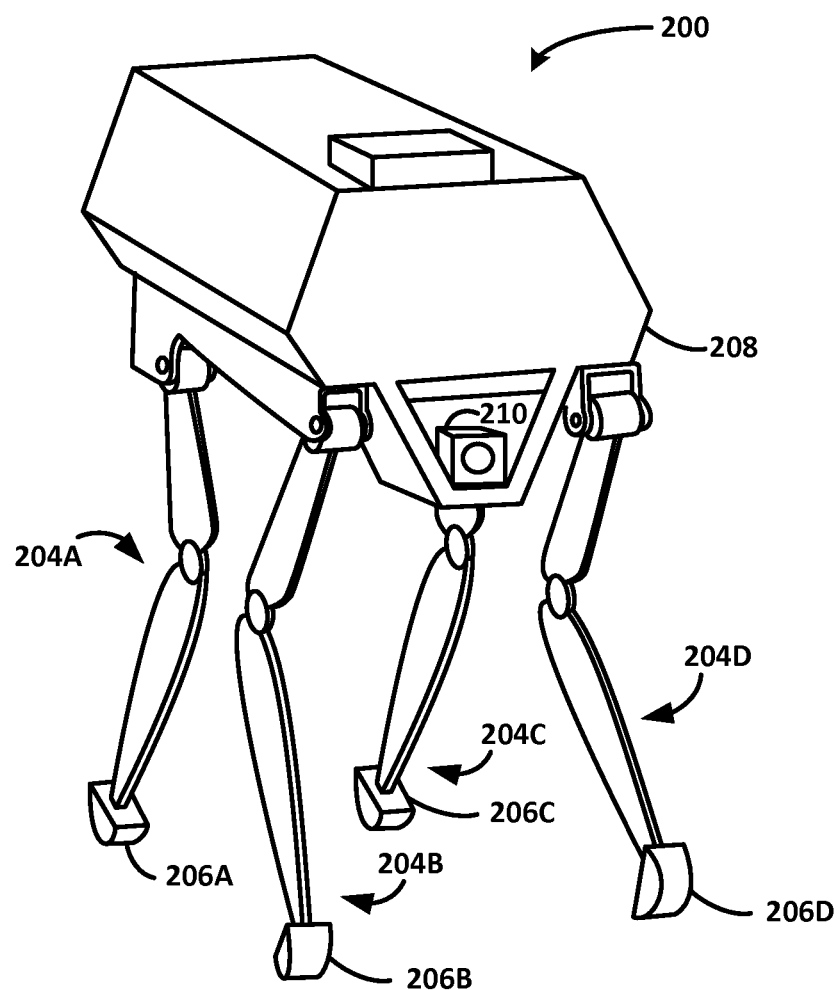
FIG. 2 illustrates a quadruped robotic device, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
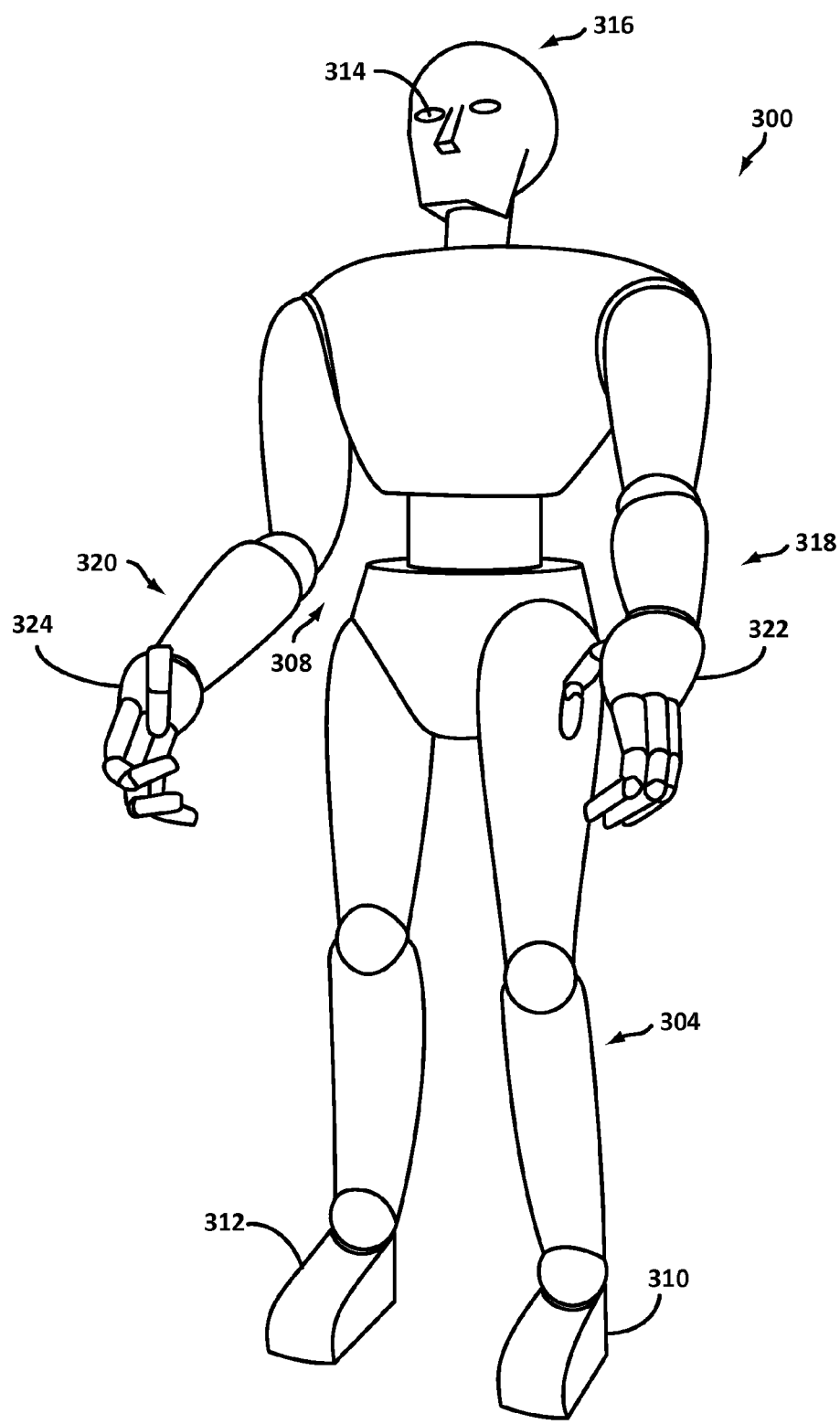
FIG. 3 illustrates a biped robotic device, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE IMPLEMENTATION

Figure 4:
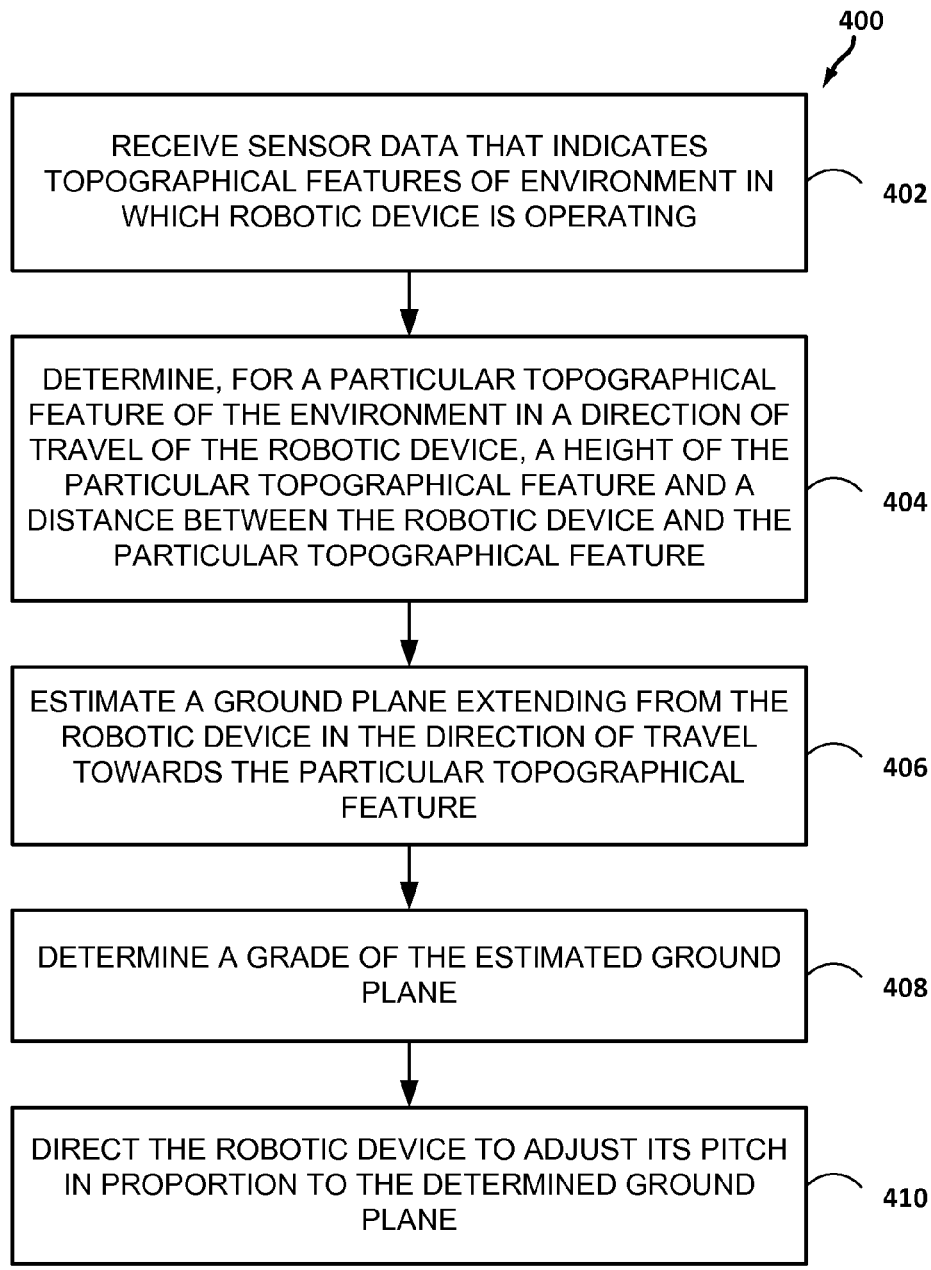
FIG. 4 is a flowchart according to an example implementation.

FIG. 4 is a flow chart illustrating an example implementation 400 of a technique to adjust the posture of a robot based on the surrounding terrain. Such adjustment of the robot's posture may assist the robot in traversing features of the terrain.

Implementation 400 could be used with the robotic system 100 of FIG. 1, the quadruped robot 200 in FIG. 2, and/or the biped robot 300 in FIG. 3, for example. As illustrated by blocks 402-410, implementation 400 includes one or more operations. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Within examples, operations of FIG. 4 may be fully performed by a control system, such as control system 118 of FIG. 1, or may be distributed across multiple control systems. In some examples, the control system may receive information from sensors of a robotic device, or the control system may receive the information from a processor that collects the information. The control system could further communicate with a remote control system (e.g., a control system on another device) to receive information from sensors of this other device, for example.

In addition, for FIG. 4 and other implementations disclosed herein, the flow chart shows the operation of one possible technique. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. In addition, for FIG. 4 and other techniques disclosed herein, each block may represent circuitry that is arranged to perform the specific logical functions in the process.

At block 402 of FIG. 4, the example implementation 400 involves receiving sensor data that indicates topographical features of an environment in which a robotic device is operating. For instance, control system 118 of robotic system 100 shown in FIG. 1 may receive sensor data from sensor(s) 112, perhaps by way of data storage 104. In some implementations, the sensor(s) 112 monitor the environment in real time, and generate data indicating obstacles, elements of the terrain, weather conditions, temperature, and/or other aspects of the environment.

As noted above, sensor(s) 112 include one or more sensors that, in operation, generate data indicative of topographical features of an environment in which robotic system 100 is operating. As noted above, these sensors may include one or more cameras. For instance, some implementations may include a vision system (which may include one or more stereoscopic cameras) to provide 3D vision data. As noted above, other examples sensors include RADAR, LIDAR, SONAR, VICON®, a global positioning system (GPS) transceiver, and/or other sensors for capturing information of the environment in which the robotic system 100 is operating.

In operation, one or more processors (e.g., processor(s) 102) of control system 118 may receive or otherwise gain access to the data generated by the sensor(s) 112. The one or more processors may analyze the data to detect obstacles, elements of the terrain, weather conditions, temperature, and/or other aspects of the environment.

At block 404 of FIG. 4, the example implementation involves determining, for a particular topographical feature of the environment in a direction of travel of the robotic device, a height of the particular topographical feature and a distance between the robotic device and the particular topographical feature. For instance, control system 118 of robotic system 100 shown in FIG. 1 may receive sensor data from sensor(s) 112, which processor(s) 102 of control system 118 may process to identify topographical feature(s) in the direction of travel of robotic system 100. Processor(s) 102 of control system 118 may further process the data to determine a height of the topographical feature and a distance between the robotic device and the particular topographical feature. Example topographical features include curbs, steps, ramps, slopes, or any portion of the environment.

As noted above, in operation, a control system of the robotic device may direct the robotic device to move in a particular direction. While the robotic device is moving, sensors of the robotic device may generate data indicating a direction of travel perceived by the sensors. For instance, a control system may receive data from a GPS sensor indicating two or more locations and infer the direction of travel of the robotic device based on the relative positions of those two or more locations. As another example, some sensors, such as RADAR, LIDAR, or SONAR sensors, may indicate relative distances between the sensor and various features of the environment, by which the control system of the robot may determine the direction of travel (e.g., by inferring direction of travel based on perceived movement of the robotic device relative to detected topographical features of the environment).

In some implementations, the control system identifies a portion of the environment as the particular topographical feature. The portion of the environment may correspond to an area of the environment that the control system expects the robotic device to traverse. The control system may identify a particular portion of the environment that is located a certain number of strides in advance of the robotic device (in the direction of travel). This number of strides may correspond to the number of strides expected to be taken by the robot while adjusting its posture. For example, a biped robot might adjust its pitch during one stride, but a quadruped robot might take more than one stride while changing its posture (e.g., one and one half strides) since quadruped robots may have more points of contact with the ground.

Relative to other portions of the environment that are located closer or further away from the robotic device, sensing this portion of the environment may have various advantages. For instance, if the control system were instead to consider a portion of the environment that is closer to the robotic device, the robotic device might not have sufficient time to adjust its posture before traversing that portion of the environment. Moreover, sensing a portion of the environment that is further in advance of the robotic device may increase uncertainty in the sensor measurements, as the error inherent in sensing may increase with distance from the sensors. Additionally, when considering a portion of the environment that is further in advance of the robotic device, the control system may incorrectly determine at what time the robot will traverse that portion, as the robot's sensor might not perfectly sense the robot's position relative to the portion of the environment. This may result in the control system adjusting the robot's posture unnecessarily early (i.e., steps before the robot will traverse the topographical feature) or too late (i.e., after the robot has traversed the topographical feature).

The control system may determine the distance between the robotic device and the particular topographical feature based on the speed and gait of the robotic device, as this distance varies on these characteristics of the robotic device's movement. For example, when moving at 5 meters per second according to a running gait, a robotic device may cover relatively more distance during a stride than when the same robotic device moves at 1 meter per second according to a walking gait. In some implementations, the robotic device direct its sensor(s) toward the relevant portion of the environment such that as the robotic device moves through the environment, the sensors continue to sense the relative portion of the environment that is located in advance of the robotic device. Alternatively, the sensors may sense a larger portion of the environment surrounding the robot. Within this larger portion, the control system may identify a relevant portion of the environment based on the speed, gait, and direction of travel of the robotic device, which the control device may determine from sensor data indicating these characteristics of the robot's motion.

In some implementations, the control system may vary the technique used in determining the distance between the robotic device and the particular topographical feature based on the type of sensor data received. Some sensors, such as RADAR, LIDAR, or SONAR, may generate data indicating relative distance between the sensor and the sensor's target (e.g., a topographical feature of the environment). Sensor data from other types of sensors, such as stereocameras, can be used to determine relative distance between the sensor and the sensor's target using techniques such as stereo triangulation.

In some cases, a control system of a robotic device may determine, for one or more additional topographical features of the environment in the direction of travel of the robotic device, a height of the additional topographical feature and a distance between the robotic device and the additional topographical feature. For instance, the control system may identify additional topographical features within the received sensor data that are in the direction of travel of the robotic device. Such topographical features may include features that are closer or further away from the robotic device. These additional topographical features provide additional data points that may assist the control system in estimating the ground plane of the upcoming terrain.

In some implementations, the robotic device processes the sensor data (e.g., sensor data from a vision system) into a topographical map of the environment surrounding the robot. As a robot moves through an environment, additional sensor data may be incorporated into the map (or a new map may be generated) such that the control system maintains a topographical sense of the environment surrounding the robot. The control system of the robotic device may identify a portion of the topographical map as the particular topographical feature. As indicated above, the particular portion identified may vary based on the robot's speed, gait, and direction.

In some implementations, the topographical map is represented by data indicating a matrix (or array) of discrete cells. For example, the topographical map could be a two-dimensional matrix of discrete cells with each cell representing a portion (e.g., 5 sq. cm, 10 sq. cm, or another granularity) of the environment in which the robotic device is operating. Since each cell corresponds to a portion of the environment having known dimensions, the topographical map may indicate respective distances between the discrete cells and the robotic device.

Within examples, the robotic device may assign respective values to the discrete cells that indicate sample heights of respective portions of the environment. Topographical features of different heights may result in discrete cells indicating different sample heights corresponding to the different heights of the topographical features. Within examples, the value of each cell may be based on a measure representing the average height of the cell. For instance, the processor(s) 102 may average (or otherwise process) samples from the sensor(s) 112 that correspond to the respective portions of the environment.

Figure 5:
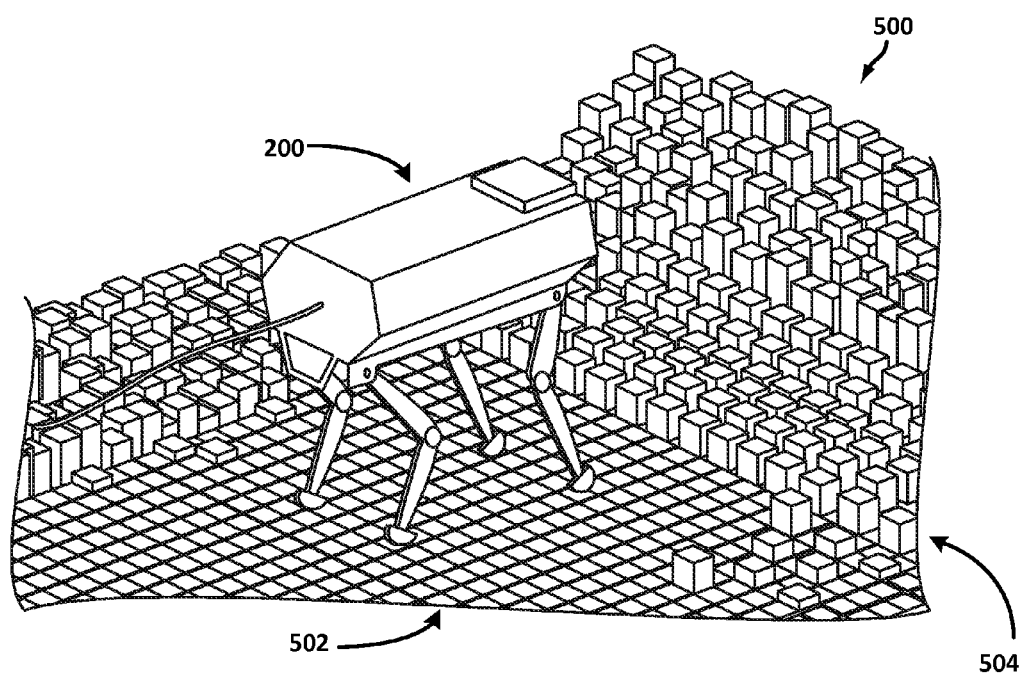
FIG. 5 illustrates a topographical map of an environment in which a robot is operating, according to an example implementation.

FIG. 5 is a visual representation of a topographical map 500 of an environment in which quadruped robot 200 is operating. Topographical map 500 might be created from data generated by a stereocamera system. Topographical map 500 includes a matrix 502 of discrete cells representing portions of the environment in which quadruped robot 200 is operating. To illustrate the sample heights, the discrete cells of the two-dimensional topographical map are shown with a third dimension indicating their respective sample heights. As one example, a control system may identify a portion of the topographical map 500 that includes the step 504 as the particular topographical feature.

Referring back to FIG. 4, at block 406, the example implementation involves estimating a ground plane extending from the robotic device in the direction of travel toward the particular topographical feature. In estimating the ground plane, the control system may attempt to determine a ground plane that approximates the upcoming terrain. Variability of the terrain in advance of the robotic device is smoothed into a plane that represents that variability in aggregate.

In some implementations, a control system may determine a ground plane which fits to the determined distance and height of the particular topographical feature. Such a ground plane may be based on the change in height between the robotic device and the particular topographical feature that occurs the distance between the robotic device and the particular topographical feature.

Figure 6A:
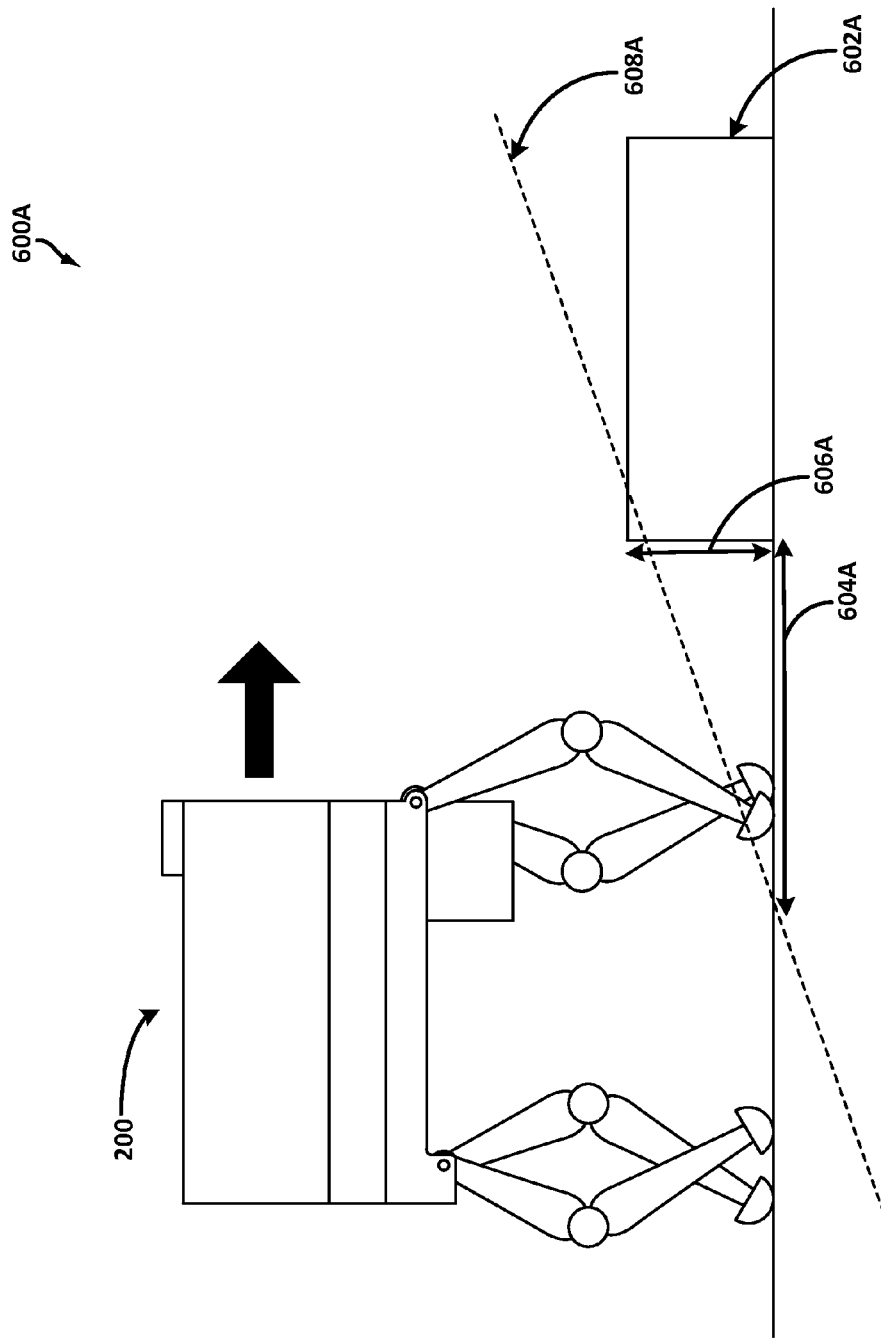
FIG. 6A illustrates an example environment in which a quadruped robot is operating, according to an example implementation.

For example, FIG. 6A is a side view of example quadruped robot 200 operating in an example environment 600A. As represented by the arrow, the direction of travel of quadruped robot 200 is toward the right. Environment 600A includes a topographical feature 602A (a curb) in the direction of travel of the robotic device. In one example, based on sensor data received from the sensors of quadruped robot 200, the control system determines a distance 604A between quadruped robot 200 and topographical feature 602A as well as a height 606A of topographical feature 602A. The control system of quadruped robot 200 may then estimate plane 608A to approximate the upcoming terrain. As shown in FIG. 6A, the estimated ground plane fits to the determined distance and height.

As another example, a biped robot may encounter a similar topographical feature. FIG. 6B is a side view of example biped robot 300 operating in an example environment 600B. As represented by the arrow, the direction of travel of biped robot 300 is toward the right. Environment 600B includes a topographical feature 602B (a curb) in the direction of travel of the robotic device. In one example, biped robot 300 may perform similar operations to quadruped robot 200 as described with respect to FIG. 6A. For instance, based on sensor data received from the sensors of biped robot 300, the control system determines a distance 604B between biped robot 300 and topographical feature 602B as well as a height 606B of topographical feature 602B. The control system of biped robot 300 may then estimate plane 608B to approximate the upcoming terrain. As shown in FIG. 6B, the estimated ground plane fits to the determined distance and height.

In some implementations, the control system may estimate the ground plane by way of a technique to determine a line of "best fit," such as a linear regression. For instance, the robotic device and one or more topographical features may be represented as respective points on a plot. The x-axis and y-axis of the plot may represent distance and height, respectively. The current position of the robotic device in the environment could be plotted at a reference point on the plot (e.g., the origin) with the topographical features plotted relative to that reference position. The control system may perform a linear regression or other linear fit analysis on the plotted points to determine a line of best fit. This line of best fit corresponds to the ground plane, as viewed from the side.

Figure 7:
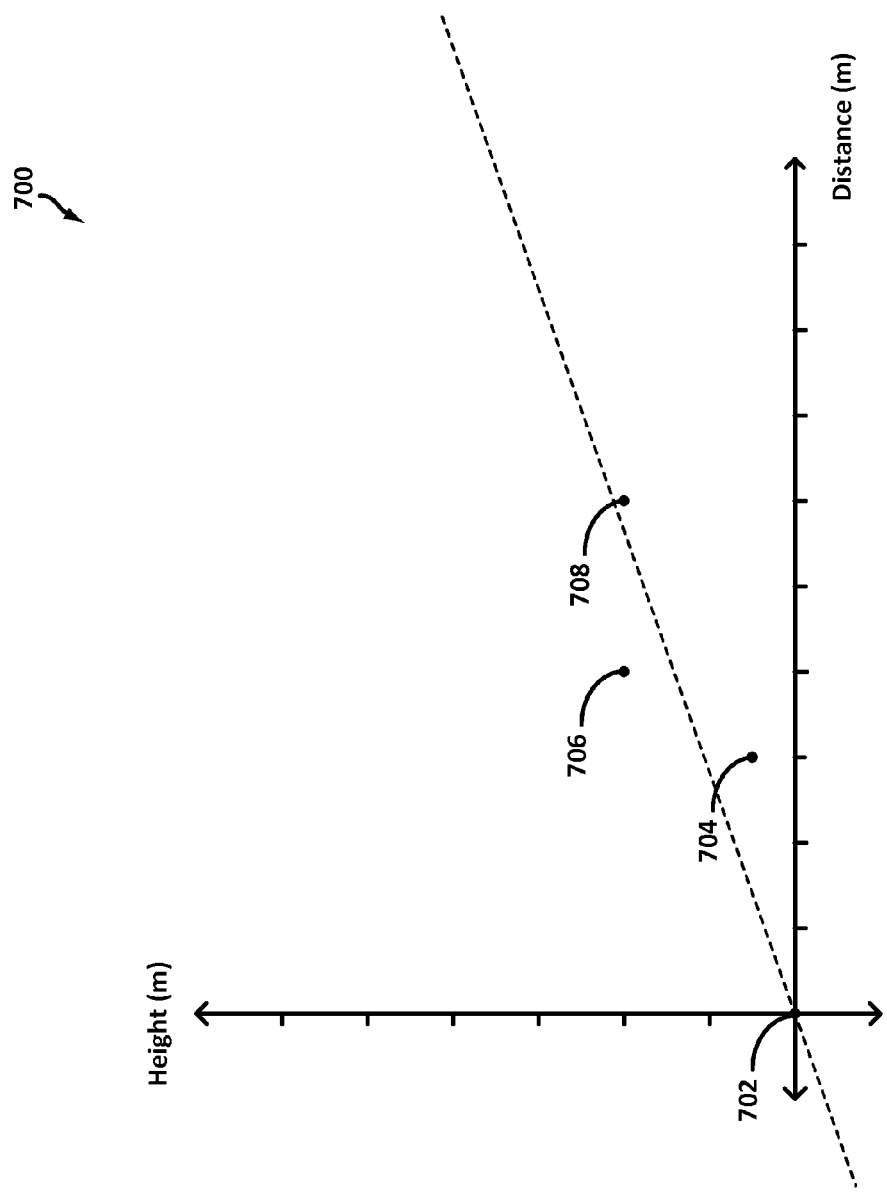
FIG. 7 is an example plot representing various features of an example environment, according to an example implementation.

FIG. 7 illustrates an example plot 700 that in which a robotic device is represented as the origin point 702. Points 704, 706, and 708 represent respective topographical features detected by the robotic device. Point 704 on plot 700 indicates the relative distance between a first topographical feature and the robotic device (by way of the distance along the x-axis between point 702 and point 704). Point 704 also indicates the height of the topographical feature (by way of the point's plotted position along the y-axis). As shown, points 706 and 708 have been similarly plotted to indicate their respective distances and heights relative to the robotic device. To estimate a ground plane, one or more processors (e.g., processors implemented within a control system of the robotic device) may determine a line of best fit corresponding to points 702, 704, 706, and/or 708, perhaps by way of a least squares regression. The estimated plane may correspond to the line of best fit in the x and y directions (and extend in the z direction).

Referring back to FIG. 4, at block 408, the example implementation involves determining a grade of the estimated ground plane. If the robotic device is traversing flat terrain (i.e., terrain that is approximately perpendicular to gravity), the grade of the estimated ground plane may be the slope of the line of best fit corresponding to the estimated ground plane. Alternatively, if the robotic device is traversing sloped terrain, the grade of the estimated ground plane may be the slope of the estimated ground plane offset by the slope of the terrain that the robotic device is currently traversing (or was traversing when the sensor data on which the estimated ground plane is based was captured). For instance, if the robot is currently traversing ground with a 4% grade, and estimates the ground plane of the upcoming terrain as having a grade of 5%, the actual grade of the upcoming terrain relative to gravity might be 14%.

At block 410 of FIG. 4, the example implementation may involve directing the robotic device to adjust its pitch in proportion to the determined grade. For instance, referring to FIG. 6A, processor(s) 102 of a control system 118 may direct quadruped robot 200 to change its gait so as to adjust the pitch of the quadruped robot 200. As another example, referring to FIG. 6B, processor(s) 102 of a control system 118 may direct biped robot 300 to change certain gait parameters so as to adjust the pitch of biped robot 300. Such changes in pitch may offset the grade of the terrain that the robots are traversing, which may improve kinematic reachability and/or balance.

Kinematic reachability refers to the ability of a robot's limbs (e.g., its legs) to reach a target (e.g., the ground). On flat terrain, the legs of a robot might be able to contact the ground reliably, as the terrain is roughly the same distance from each leg. However, on uneven terrain, the legs of a robot might reach full extension before contacting the ground, since two or more of the robot's legs may be in contact with portions of the ground that are of different heights. By adapting to the grade of the terrain, the legs of a quadruped robot become relatively more equidistant to the ground, which may improve the ability of the robot's legs to reach the ground before fully extending its joints.

As noted above, a robotic device may change its pitch by changing its gait (e.g., by adapting certain gait parameters that change the pitch of the robot). To cause a legged robot to take a step, a control system may instruct actuators to perform a series of actuations in which a foot of the robot is lifted from the ground, swung forward (or backward), and lowered back to the ground.

To adjust the robot's pitch, the control system may change the actuations performed during one or more cycles of the gait by applying a force to the ground. More particularly, for a step of a given leg, the control system may determine a torque to apply a particular force at the foot of the given leg (along the given leg, or lever-arm, to which the foot is attached). In some cases, the control system may also determine one or more additional torques to apply force at one or more of the robot's other feet, as the pitch adjustment may occur over more than one step. The control system may control actuators to perform a series of actuations in which these torques are applied in an effort to adjust the robot's pitch.

Figure 8A:
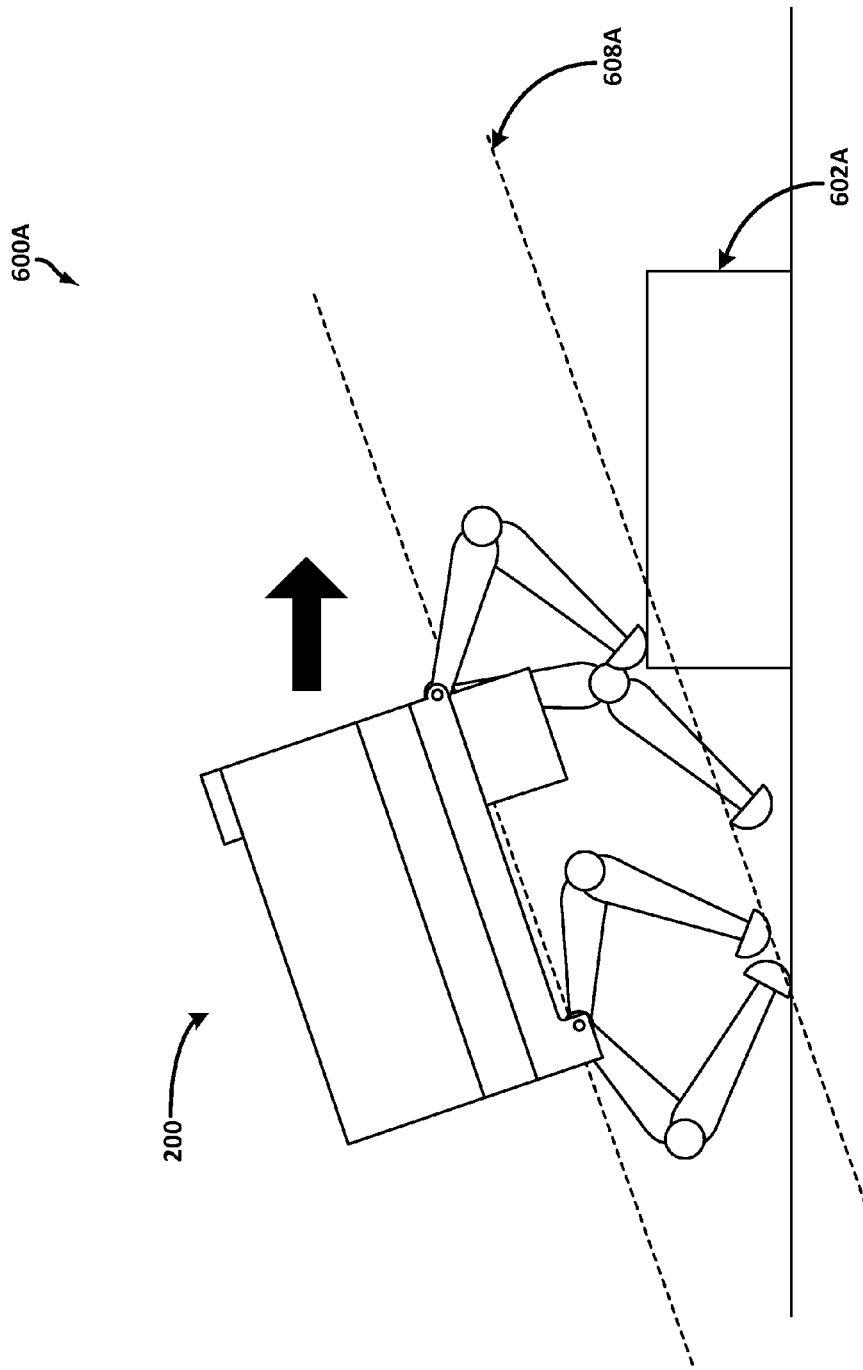
FIG. 8A illustrates the example environment in which the quadruped robot is operating, according to an example implementation.

FIG. 8A is another side view of example quadruped robot 200 operating in the example environment 600A. As noted above, environment 600A includes a topographical feature 602A (a curb) in the direction of travel of the robotic device, on which the control system of quadruped robot 200 may base an estimation of plane 608A so to approximate the upcoming terrain. As shown in FIG. 8A, quadruped robot 200 has adjusted its pitch in proportion to the determined grade of plane 608A.

In some implementations, a control system of a quadruped robot, such as quadruped robot 200, directs a quadruped robot, such as quadruped robot 200, to adjust its pitch to approximately match the determined grade (e.g., to match the grade within 5%). For example, as shown in FIG. 8A, quadruped robot 200 has adjusted its pitch in proportion to approximately match the grade of plane 608A. As noted above, such an adjustment may improve the kinematic reachability of the terrain relative to the robot, as the robot's front and rear legs may become relatively more equidistant to the ground after this adjustment.

Figure 8B:
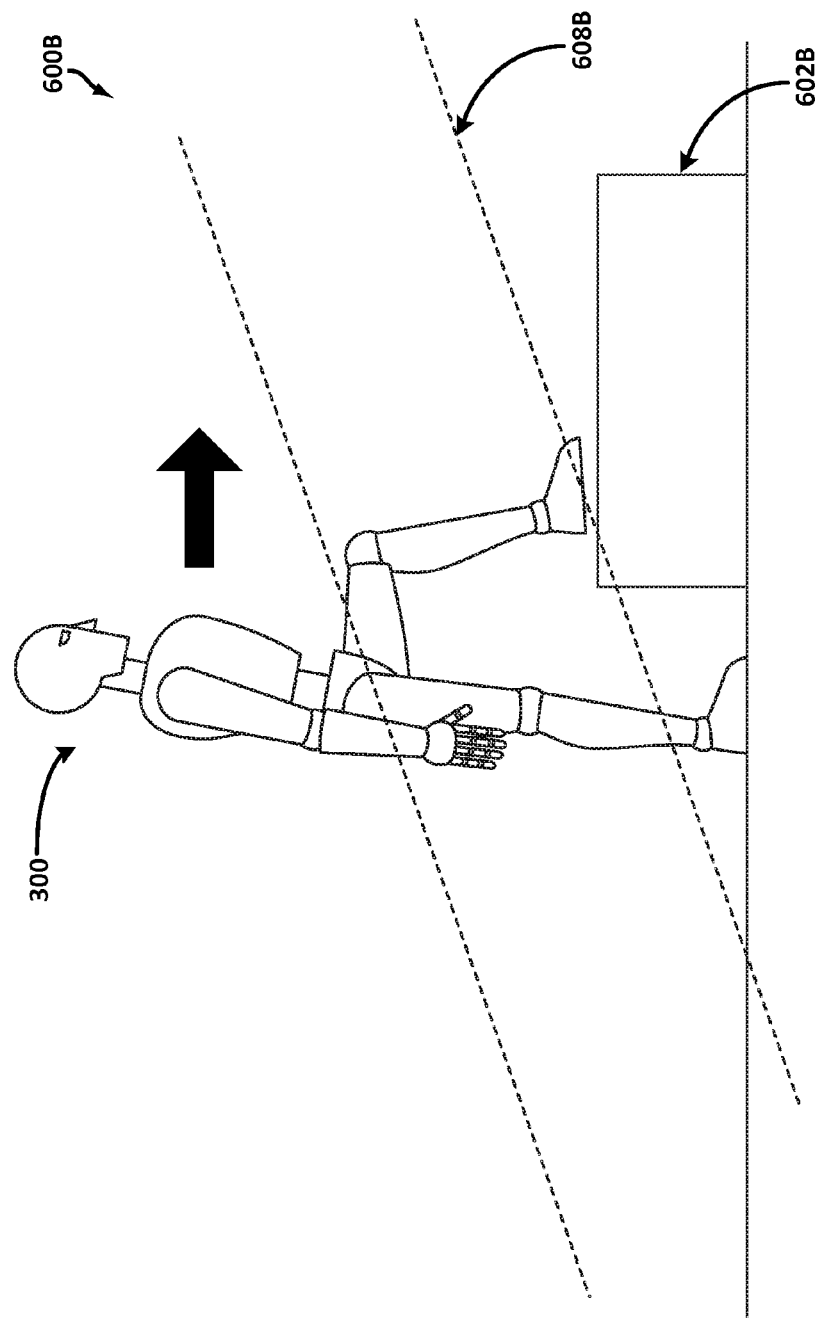
FIG. 8B illustrates the example environment in which the biped robot is operating, according to an example implementation.

FIG. 8B is another side view of example biped robot 300 operating in the example environment 600B. As noted above, environment 600B includes a topographical feature 602B (a curb) in the direction of travel of biped robot 300. The control system of biped robot 300 may base an estimation of plane 608B on topographical feature 602B so to approximate the upcoming terrain. As shown in FIG. 8B, biped robot 300 has adjusted its pitch in proportion to the determined grade of plane 608A by pitching forward relative to the vertical plane (formed by gravity).

Within examples, a control system of a biped robot, such as biped robot 300, cause the biped robot to pitch toward the grade of the estimated ground plane by a degree that is a portion of the determined grade. By pitching toward the grade (e.g., pitching forward if ascending, backward if descending), the biped robot may shift its center of mass forward (or backward), which results in the robot's center of stance being shifted toward the grade (e.g., uphill). Such a position may improve kinematic reachability. Moreover, by adjusting its pitch by a portion of the determined grade (rather than to match the grade, as with some quadruped implementations), a biped robot may remain more stable and less prone to tipping. Example portions of the determined grade range from 10-40% (e.g., from 20-30%).

In some implementations, a control system of a robot directs the robot to initiate pitch adjustment between one and two strides in advance of the upcoming topographical feature. During these stride(s), the robot may adjust its pitch such that by the time the robot reaches the topographical feature, the robot has adjusted pitch to offset the grade formed by the topographical feature. For example, referring back to FIG. 6A, quadruped robot 200 may begin adjusting its pitch one and one half strides in advance of curb 602A, such that quadruped robot 200 is pitched in proportion to plane 608A by the time that quadruped robot 200 traverses curb 602A (as shown in FIG. 8A). A quadruped robot might take more than one stride to adjust pitch because it has more than one contact point with the ground (e.g., at any point in a gait cycle, a given one of the front legs and a given one of the rear legs may be each in contact with the ground). As another example, referring back to FIG. 6B, biped robot 300 may begin adjusting its pitch one stride in advance of curb 602B, such that biped robot 300 is pitched toward plane 608A by the time that it traverses curb 602B (as shown in FIG. 8B).

Such timing of the pitch adjustment may assist a robot in traversing a topographical feature, as kinematic reachability may be improved as the robot traverses the feature. Moreover, this timing might avoid jeopardizing kinematic reachability on terrain in advance of the topographical feature forming the grade, as such timing might avoid pitch adjustment that is unnecessarily early.

In operation, a control system of a robotic device may determine respective swing trajectories for its feet. During a step, a control system may direct actuators to move a given foot so as to follow a particular swing trajectory. When viewed from the side, the swing trajectory of a given foot may appear to have a quadrilateral shape which is created by the robot picking its foot up from a support surface, stepping forward, and setting its foot back to the support surface (with the fourth side of the quadrilateral being created by the support surface). In practice, the swing trajectory might not have a perfectly quadrilateral shape, as the corners might be smoothed out. For instance, a control system might determine a leg swing trajectory that traces a spline function (e.g., a quadratic spline) having knot points on the quadrilateral.

Within examples, a robotic device may reduce speed based on an upcoming change in ground plane. For instance, a control system may determine that the grade of the estimated ground plane is different from the current grade by more than a threshold difference in grade (e.g., 5%-10%). This type of transition might occur when the terrain is transitioning from a flat terrain to an uphill grade, from a downhill grade to flat terrain, or vice versa, among other possibilities. Based on determining that such a change in grade is upcoming, the robotic device may reduce speed in advance of the upcoming grade change.

In some embodiments, a control system may reduce speed by configuring a lower maximum speed (perhaps with the actual speed influenced by other factors, such as the configured gait or speed of the robotic device). The maximum speed set by the control system may be proportional to the difference in grade. For instance, for a relatively greater change in grade, the control system may configure a lower maximum speed.

Swing trajectories of the robot's legs may be based on the estimated ground plane. For instance, a control system may determine, for a step of a given leg, a leg swing trajectory in which the given leg is lifted upward in a direction that is opposite of gravity, stepped forward in a direction that is parallel to the determined grade of the estimated ground plane, and lowered downward in the direction of gravity. With a non-zero pitch, such a swing trajectory may be roughly parallelogram shaped. On flat terrain, the swing trajectory may be roughly rectangular. As noted above, in practice, trajectories may approximate these shapes as the sharp corners of a parallelogram may be impractical. Instead, the rough parallelogram shape may be used as the basis for a smooth spline that is continuous in position, velocity, and/or acceleration.

As a robotic device traverses an environment, the robotic device may repeat certain of these operations to continually adjust pitch. For instance, as a biped robot ascends a hill, the biped robot may continually pitch forward to offset the upward grade of the hill. As the biped robot descends the hill, the biped robot may continually pitch backward to offset the downward grade of the hill. On reaching flat terrain, the robot may again perform these operations to adjust its pitch based on the flat terrain (e.g., by adjusting its pitch to walk upright).

Figure 9:
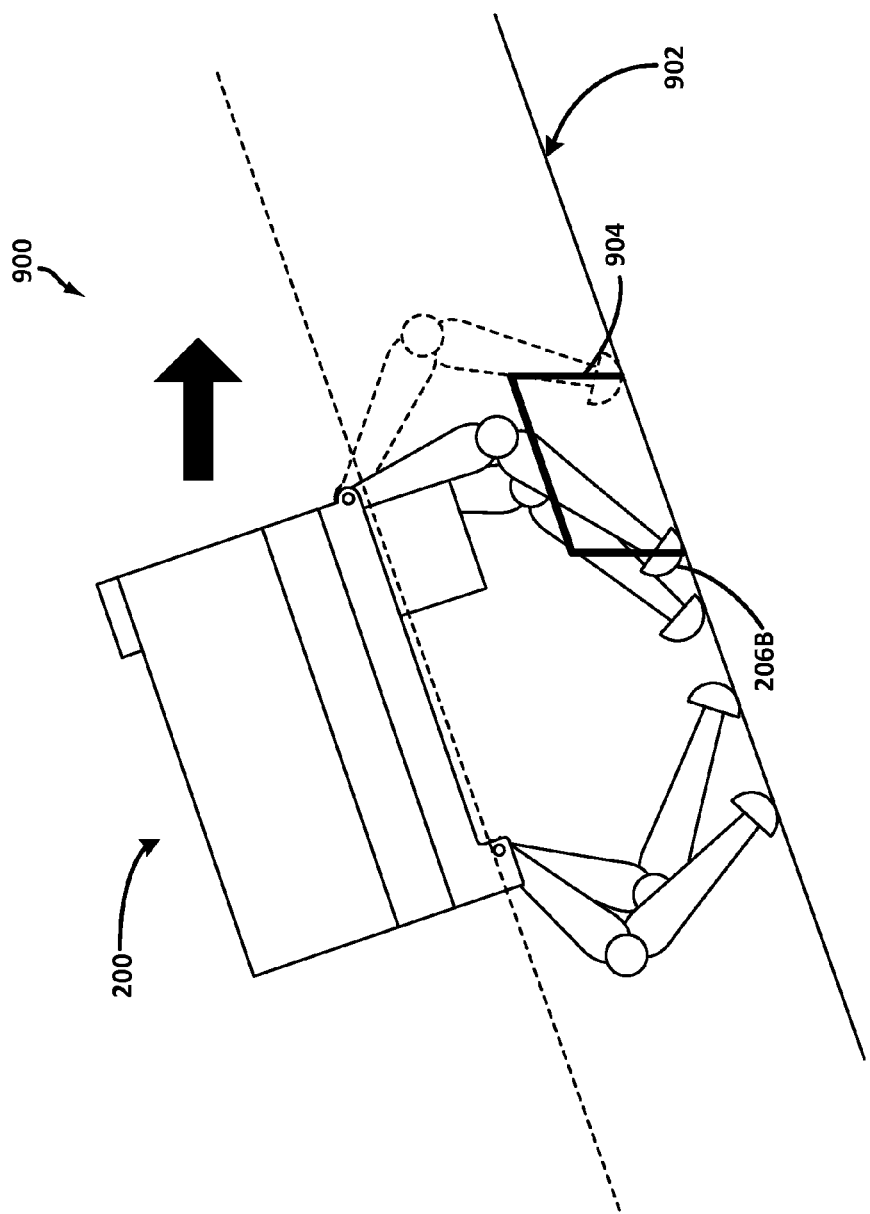
FIG. 9 illustrates another example environment in which a quadruped robot is operating, according to an example implementation.

FIG. 9 is a side view of example quadruped robot 200 operating in an example environment 900 having a graded ground plane 902. As represented by the arrow, the direction of travel of quadruped robot 200 is toward the right so as to ascend. Quadruped robot 200 is pitched to match the determined grade of the ground plane. Swing trajectory 904 illustrates an example swing trajectory of foot 206B. As shown, swing trajectory 904 roughly forms a parallelogram. Accordingly to swing trajectory 904, foot 206B is lifted upward in a direction that is opposite of gravity, stepped forward in a direction that is parallel to the determined grade of the estimated ground plane, and lowered downward in the direction of gravity. In some circumstances, such a swing trajectory may avoid foot entrapment (e.g., tripping) compared to some other swing trajectory.

In some implementations, a control system may determine swing trajectories for the feet of a legged robot on a foot-by-foot basis. For instance, referring to FIG. 2, the control system may determine a respective swing trajectory for feet 206A, 206B, 206C, and 206D in a given gait cycle. Within a given gait cycle, a step path for foot 206A might be referred to as a first swing trajectory, a swing trajectory for foot 206B might be referred to as a second swing trajectory, and so on for feet 206C and 206D.

In some cases, a robot may traverse terrain that is uneven in a direction that is perpendicular to the robot's direction of travel. Such uneven terrain may be referred to as ground roll. As noted above, a control system of a robotic device may receive sensor data indicating topographical features of the environment in which the robotic device is operating and process this data to detect relevant topographical features. In some cases, the control system may detect within such data topographical features in the direction of travel that forms ground roll. Like pitch, ground roll may affect kinematic reachability.

Figure 10:
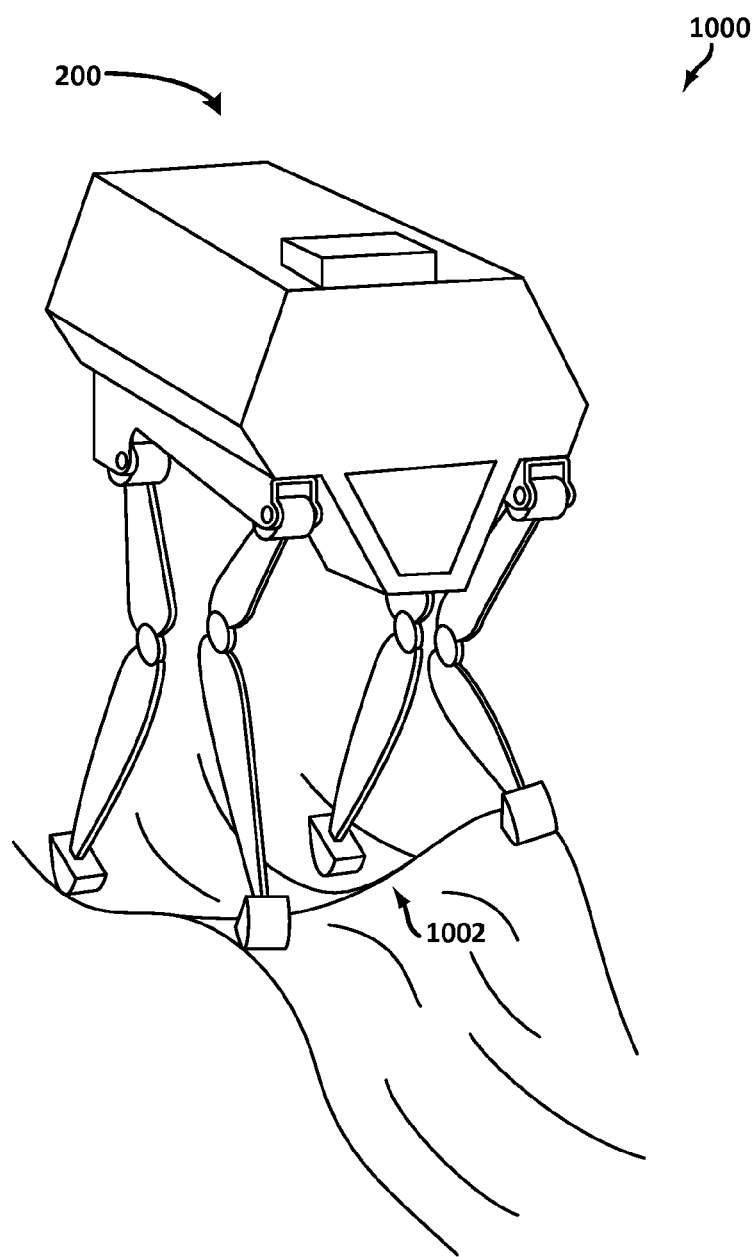
FIG. 10 illustrates a further example environment in which a quadruped robot is operating, according to an example implementation.

FIG. 10 shows quadruped robot 200 operating in an example environment 1000 in which the terrain 1002 forms ground roll. To offset such ground roll, a robotic device may reduce the robot's height by bending its legs. For instance, quadruped robot 200 may bend legs 204A, 204B, 204C, and 204D at the hip and/or knee joints, which causes body 208 to lower. Control system 118 may direct quadruped robot 200 to conduct a gait with its legs at the lowered height. Such a gait may improve kinematic reachability on uneven terrain, as the legs may extend by a greater degree before reaching full extension.

In some implementations, a control system of a robotic device may reduce its height by a particular degree. For instance, the control system may determine a magnitude of the ground roll formed by the topographical feature in the direction of travel, perhaps by determining the magnitude of the roll of the estimated ground plane. For instance, the control system may determine a distance in height between two cells of a topographical map (e.g., topographical map 500 of FIG. 5) that represent ground roll. The control system may then direct the robotic device to reduce its height in proportion to the determined magnitude of the ground roll.

IV. CONCLUSION

The present disclosure is not to be limited in terms of the particular implementations described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example implementations described herein and in the figures are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each step, block, and/or communication can represent a processing of information and/or a transmission of information in accordance with example implementations. Alternative implementations are included within the scope of these example implementations. In these alternative implementations, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other implementations can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A control system comprising:
one or more processors;
a non-transitory computer readable medium; and
program instructions stored on the non-transitory computer readable medium and executable by the one or more processors to:
receive sensor data that indicates topographical features of an environment in which a robot is operating, wherein the robot has a torso;
determine, for a particular topographical feature of the environment in a direction of travel of the robot, a height of the particular topographical feature and a distance between the robot and the particular topographical feature;
estimate a ground plane extending from the robot in the direction of travel toward the particular topographical feature, the ground plane fitting to the determined distance and height;
determine a grade of the estimated ground plane; and
control actuators of the robot so as to cause the robot to pitch the torso based on the grade of the estimated ground plane.

2. The control system of claim 1, wherein directing the robot to pitch the torso based on the grade of the estimated ground plane comprises pitching the torso by a degree that is a portion of the determined grade.

3. The control system of claim 1, wherein the robot has a leg, and wherein the program instructions are further executable to:
for a step of the leg, determine a swing trajectory that traces a spline function having knot points on a quadrilateral in which the leg is lifted upward in a direction that is opposite of gravity, stepped forward in a direction that is parallel to the determined grade of the estimated ground plane, and lowered downward in the direction of gravity; and cause the robot to move the leg based on the determined swing trajectory.

4. The control system of claim 1, wherein directing the robot to pitch based on the grade of the estimated ground plane comprises directing the robot to adjust a pitch of the torso approximately one stride in advance of the particular topographical feature.

5. The control system of claim 1, wherein directing the robot to pitch the torso based on the grade of the estimated ground plane comprises directing the robot to adjust a pitch of the torso between one and two strides in advance of the particular topographical feature.

6. The control system of claim 1, wherein the robot has legs, and wherein the program instructions are further executable to:
   detect, within the sensor data that indicates topographical features of the environment of the robot, a topographical feature in the direction of travel that forms ground roll;
   determine a magnitude of the ground roll formed by the topographical feature in the direction of travel;
   responsively cause the robot to reduce its height in proportion to the determined magnitude of the ground roll by bending one or more respective joints of the legs; and
   while the robot is traversing the detected topographical feature, cause the robot to conduct a gait with the legs while maintaining the reduced height.

7. The control system of claim 1, wherein the program instructions are further executable to:
   cause the robot to reduce its height in proportion to the determined grade by bending one or more respective joints of the legs.

8. The control system of claim 1, wherein the program instructions are further executable to:
   determine that a difference between the determined grade and a grade of a currently traversed ground plane exceeds a threshold difference in grade; and
   cause the robot to reduce speed in advance of the topographical feature.

9. A robot, comprising:
   a torso;
   at least one perception sensor; and
   a control system configured to:
      receive sensor data that indicates topographical features of an environment in which the robot is operating;
      determine, for a particular topographical feature of the environment in a direction of travel of the robot, a height of the particular topographical feature and a distance between the robot and the particular topographical feature;
      estimate a ground plane extending from the robot in the direction of travel toward the particular topographical feature, the ground plane fitting to the determined distance and height;
      determine a grade of the estimated ground plane; and
      cause the robot to pitch the torso based on the grade of the estimated ground plane.

10. The robot of claim 9, wherein directing the robot to pitch the torso based on the grade of the estimated ground plane comprises pitching the torso by a degree that is a portion of the determined grade.

11. The robot of claim 9, wherein the robot comprises a first leg, wherein the control system is further configured to:
   for a step of the first leg, determine a swing trajectory that traces a spline function having knot points on a quadrilateral in which the first leg is lifted upward in a direction that is opposite of gravity, stepped forward in a direction that is parallel to the determined grade of the estimated ground plane, and lowered downward in the direction of gravity; and
   cause the robot to move the first leg based on the determined swing trajectory.

12. The robot of claim 9, wherein directing the robot to pitch the torso based on the grade of the estimated ground plane comprises directing the robot to adjust a pitch of the torso approximately one stride in advance of the particular topographical feature.

13. The robot of claim 9, wherein directing the robot to pitch the torso based on the grade of the estimated ground plane comprises directing the robot to adjust a pitch the torso between one and two strides in advance of the particular topographical feature.

14. The robot of claim 9, wherein the robot comprises legs, and wherein the control system is further configured to:
   detect, within the sensor data that indicates topographical features of the environment of the robot, a topographical feature in the direction of travel that forms ground roll;
   determine a magnitude of the ground roll formed by the topographical feature in the direction of travel;
   responsively cause the robot to reduce its height in proportion to the determined magnitude of the ground roll by bending one or more respective joints of the legs; and
   while the robot is traversing the detected topographical feature, cause the robot to conduct a gait with the legs while maintaining the reduced height.

15. The robot of claim 9, wherein the control system is further configured to:
   cause the robot to reduce its height in proportion to the determined grade by bending one or more respective joints of the legs.

16. The robot of claim 9, wherein the control system is further configured to:
   determine that a difference between the determined grade and a grade of a currently traversed ground plane exceeds a threshold difference in grade; and
   cause the robot to reduce speed in advance of the topographical feature.

17. A method comprising:
   receiving, by a control system of a robot, sensor data that indicates topographical features of an environment in which a robot is operating, wherein the robot has a torso;
   determining, for a particular topographical feature of the environment in a direction of travel of the robot, a height of the particular topographical feature and a distance between the robot and the particular topographical feature;
   estimating a ground plane extending from the robot in the direction of travel toward the particular topographical feature, the ground plane fitting to the determined distance and height;
   determining a grade of the estimated ground plane; and
   controlling actuators of the robot so as to cause the robot to pitch the torso based on the grade of the estimated ground plane.

18. The method of claim 17, wherein directing the robot to pitch the torso based on the grade of the estimated ground plane comprises pitching the torso by a degree that is a portion of the determined grade.

19. The method of claim 17, wherein directing the robot to pitch the torso based on the grade of the estimated ground plane comprises directing the robot to adjust a pitch of the torso between one and two strides in advance of the particular topographical feature.

20. The method of claim 17, further comprising:
   determining that a difference between the determined grade and a grade of a currently traversed ground plane exceeds a threshold difference in grade; and
   causing the robot to reduce its speed in advance of the topographical feature.

* * * * *

UNITED STATES PATENT AND TRADEMARK OFFICE
CERTIFICATE OF CORRECTION

PATENT NO.         : 9,561,592 B1
APPLICATION NO.    : 14/713569
DATED              : February 7, 2017
INVENTOR(S)        : Marco da Silva et al.

Page 1 of 1

It is certified that error appears in the above-identified patent and that said Letters Patent is hereby corrected as shown below:

On the Title Page

Item (74):
Please delete "McDermott Boehnen Hulbert & Berghoff LLP" and replace it with "McDonnell Boehnen Hulbert & Berghoff LLP".

Signed and Sealed this
Eleventh Day of April, 2017

Michelle K. Lee
*Director of the United States Patent and Trademark Office*